United States Patent Office 3,737,361
Patented June 5, 1973

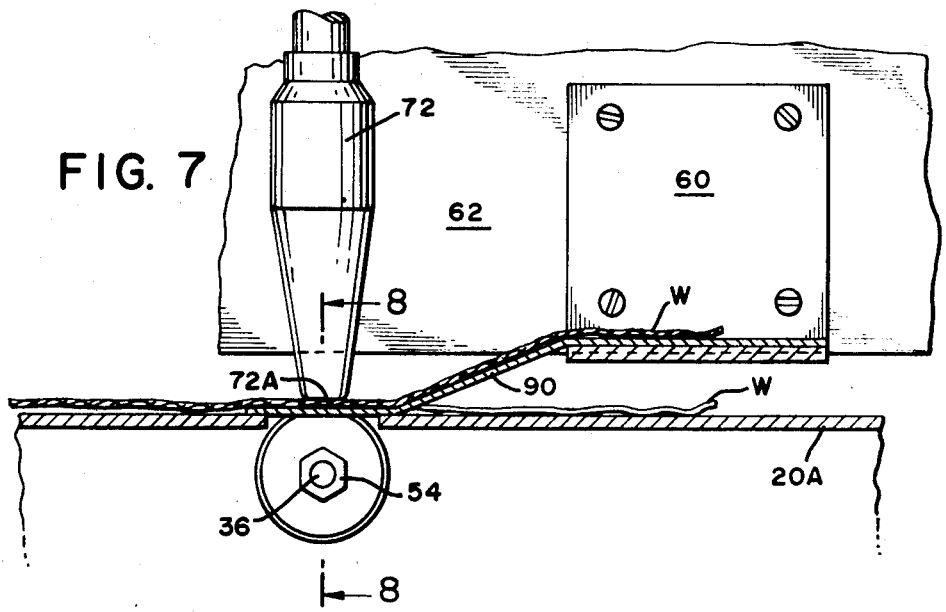
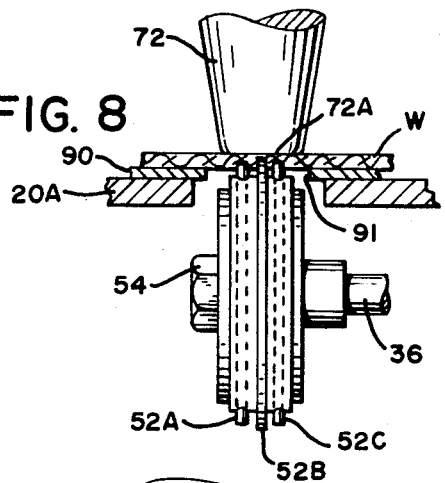
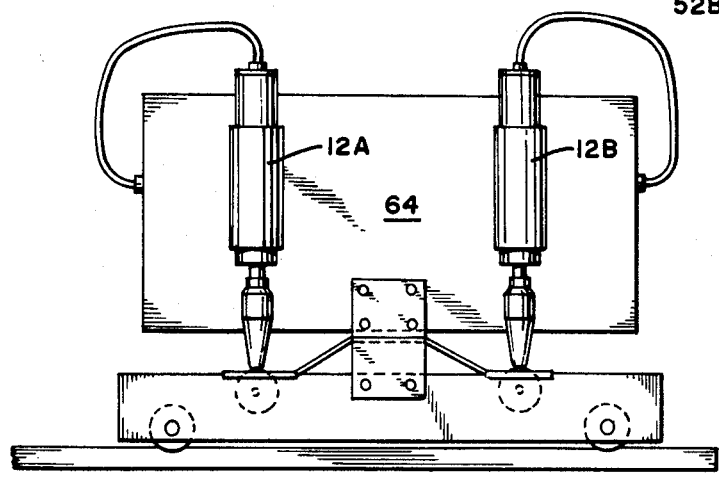

3,737,361
APPARATUS FOR EXPOSING SHEET MATERIAL TO ULTRASONIC ENERGY
Edward G. Obeda, Brookfield, Conn., assignor to Branson Instruments, Incorporated, Stamford, Conn.
Filed Dec. 2, 1971, Ser. No. 204,045
Int. Cl. B06b 3/00
U.S. Cl. 156—580                    26 Claims

ABSTRACT OF THE DISCLOSURE

The apparatus disclosed comprises a self-propelled carriage fitted with ultrasonic slitting, welding and/or embossing means and is adapted for translating motion along a set of guide rails. The ultrasonic means include a power supply and a converter unit with resonating horn opposed by a movable anvil means, the translating motion of the carriage being correlated with the motion of the anvil means. The apparatus is adapted to ultrasonically slit, weld or emboss wide sheet material, for instance slitting sheet material to blanket size, while simultaneously sealing the cut edges as such sheet material is taken from a loom.

BRIEF SUMMARY OF THE INVENTION

This invention refers to an apparatus for exposing sheet material containing thermoplastic material to ultrasonic energy along a comparatively narrow strip. More specifically, the present invention refers to an ultrasonic apparatus for treating sheet material wherein a carriage adapted to undergo translating motion along a predetermined path is fitted with an ultrasonic converter unit which includes a resonating horn. As the carriage moves along its predetermined path relative to the workpiece in the form of sheet material, ultrasonic energy is imparted to the workpiece along a comparatively narrow strip. The ultrasonic energy may be used for slitting sheet material while simultaneously fusing or welding the edges thereof. Alternatively, two overlapping edges of sheet material may be sealed together, or still further sheet material may be embossed. A typical feature of the present invention resides in the fact that the ultrasonic apparatus mounted upon the carriage includes a resonating horn which is opposed by a rotating anvil constructed in the form of a disk and that the peripheral displacement of the disk relative to the frontal surface of the horn is correlated with the translating motion of the carriage in order to prevent stretching or piling of the sheet material as the carriage undergoes its translating motion.

Further and other features of the present invention will be more clearly apparent by reference to the following description when taken in conjunction with the accompanying drawing.

BRIEF DESCRIPTION OF THE DRAWING

FIG. 7 is an elevational view, partly in section, taken along lines 7—7 in FIG. 6;
FIG. 8 is a sectional view along lines 8—8 in FIG. 7,
and FIG. 9 is an elevational view of the carriage when modified for bidirectional operation.

DETAILED DESCRIPTION OF THE INVENTION

Figure 1:
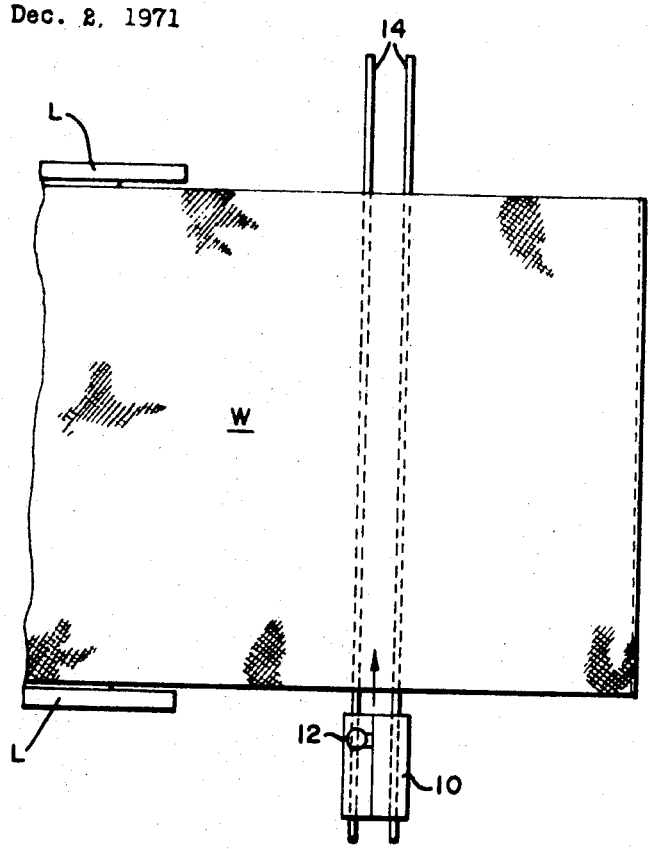
FIG. 1 is a plan view of the workpiece and carriage, when the carriage is disposed at its starting position.
Figure 2:
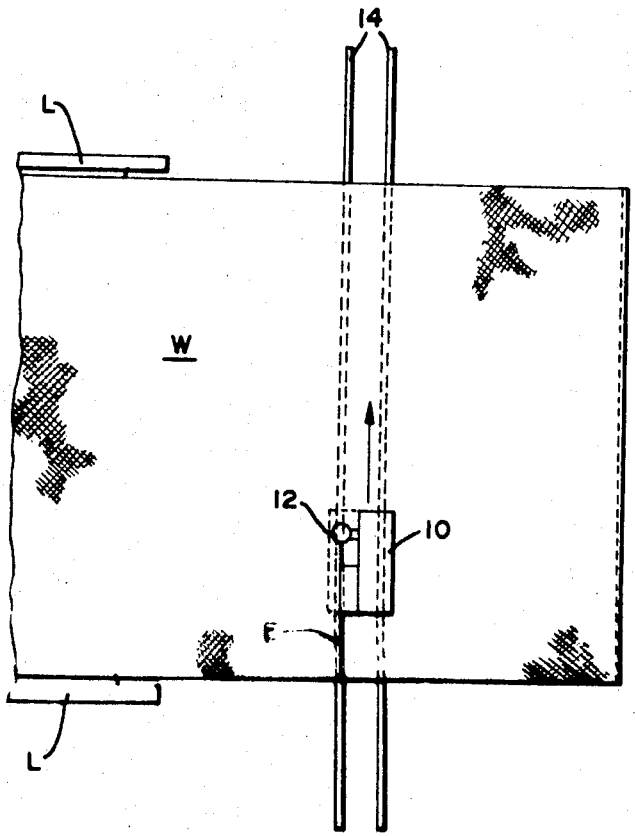
FIG. 2 is a plan view similar to FIG. 1, but the carriage having started along its translating motion.

Referring now to the figures and FIGS. 1 and 2 in particular, a sheet like workpiece W, such as a blanket made partially or entirely of thermoplastic fibers is emerging from a conventional textile loom L which fabricates such blanket or material in continuous sheet form. The material, when intended for blankets, typically may be 90 inches wide and then requires to be cut at intervals of 72 inches in order to obtain a blanket of conventional size. At the present time, such cutting is done manually by scissors with two operators cutting from opposite sides.

The present invention makes use of a self-propelled carriage 10 which is equipped with an ultrasonic apparatus 12 and which moves along a predetermined straight path on a set of rails 14. As the carriage undergoes its translating motion the sheet material W is cut and while such cutting occurs simultaneously the edges of the material are sealed, preventing rough edges caused by fraying or unravelling of the filaments and the like. As seen in FIG. 1, the carriage is positioned at its starting position and upon energizing suitable controls, described later, the carriage advances in the direction of the arrow toward the opposite side of the workpiece W. In FIG. 2, the carriage 10 has moved over a certain portion of the workpiece W and has left behind a cut E which separates the two portions.

The use of ultrasonic energy for the purpose of cutting and simultaneously sealing the cut edges produced is described, for instance, in U.S. Pat. No. 3,378,429 of the same inventor entitled "Method and Apparatus for Treating With Sonic Energy" dated Apr. 16, 1968. In this patent it is described that chair webbing and other woven material made partially or entirely of thermoplastic fibers can be slit by means of a knife oscillating at a high frequency, typically ultrasonic frequency. Because of the frictional contact of the cut material with the oscillating knife, the edges of the material melt within a very narrow zone and upon solidification of the molten material a fused and sealed edge is obtained which prevents fraying, unravelling of thread, pulling of loose threads or tufting and the like, as is normally experienced when material of this type is merely cut by conventional means. The use of ultrasonic energy, of course, greatly simplifies this operation since slitting and providing a finished edge is obtained substantially simultaneously and in one single operation, thus obviating the need for a separate finishing operation.

Referring now to the detailed construction of the carriage and the mechanisms connected therewith, reference is made of FIGS. 3 through 8. A U-shaped frame 20 having a platform 20A and two sides 20B supports two rotatable shafts 22 and 24 on which are mounted respective sets of flanged wheels 26. The wheels 26 are in engagement with guide rails 14. The shaft 24 serves as the drive shaft for propelling the carriage. An electric motor 28 (FIG. 5) is coupled to a gear reducer 30 which via a stub shaft 32 drives a pulley 34 affixed to the stub shaft 32. A shaft 36 is journalled in a pair of pillow blocks 38 and 40 and is fitted with a pulley 42 which is coupled to the pulley 34 by a flexible endless belt 44. A further pulley 46 is affixed to the shaft 36 and drives the shaft 24 via a pulley 48, affixed to the shaft 24, and a crossed endless flexible belt 50. The belt 50 is crossed in order to obtain the forward directed motion of the carriage 10, the rotation of wheels 26 being opposite to that of shaft 36.

Mounted also upon the shaft 36, there is a rotatable anvil means comprising in the present example three juxtaposed disks 52A, 52B and 52C. The disks or wheels are removably mounted upon the shaft by means of a nut 54 engaging a threaded end of the shaft 36.

The central disk 52B is provided with a comparatively sharp, yet slightly rounded peripheral surface which is adapted to act as a slitting or cutting edge, whereas the lateral disks 52A and 52C have an embossed, relief-type peripheral surface in order to provide a pleasing pattern for the border of the cut workpiece adjacent to the cut edge. The embossed pattern is subject to wide variations and may be a line pattern, an interrupted dot pattern, interrupted curves, a zigzag or chevron pattern, etc., see for instance British Pat. No. 1,167,549, entitled "Improvements Relating to Ultrasonic Welding."

It will be apparent that the lateral disks 52A and 52C are not necessary for producing the cut, but they assist in providing a strengthened border by causing sealed and fused border areas at the locations where the raised pattern forms an anvil for the opposing resonating horn which is coupled to the ultrasonic apparatus. This additional sealing produces the appearance of a finished border.

Figure 3:
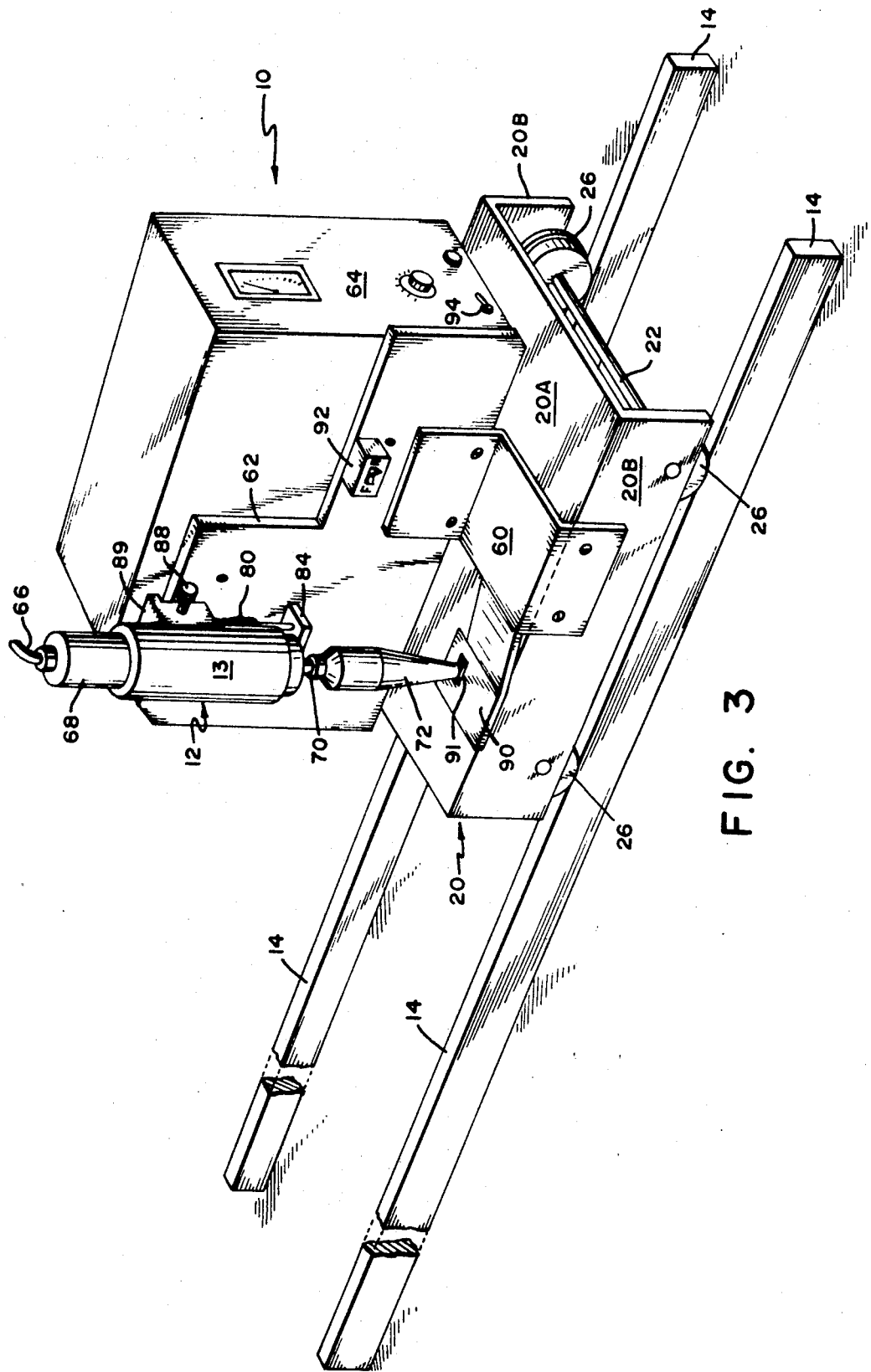
FIG. 3 is a perspective view of the carriage and the guide means, the figure showing two sides and the top of the carriage.
Figure 4:
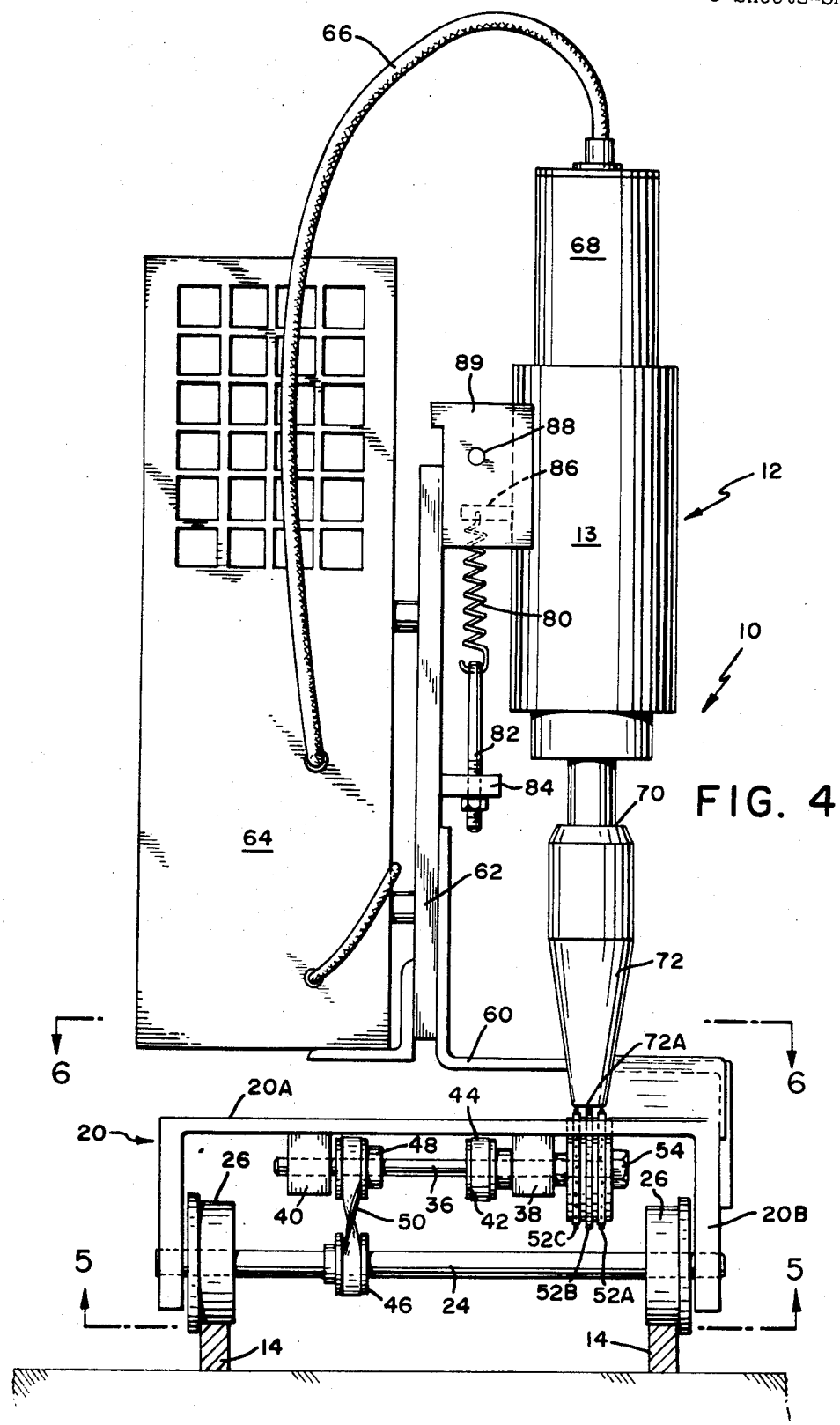
FIG. 4 is an elevational view, partly in section, of the carriage and the ultrasonic equipment supported thereupon.
Figure 5:
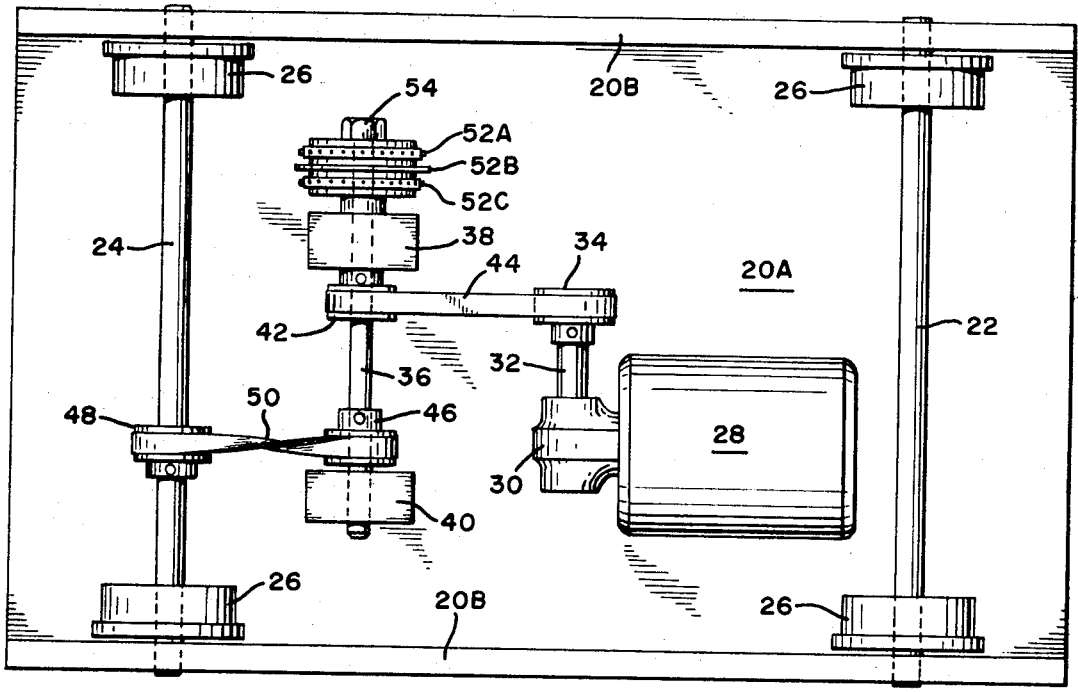
FIG. 5 is a bottom plan view along lines 5—5 in FIG. 4.
Figure 6:
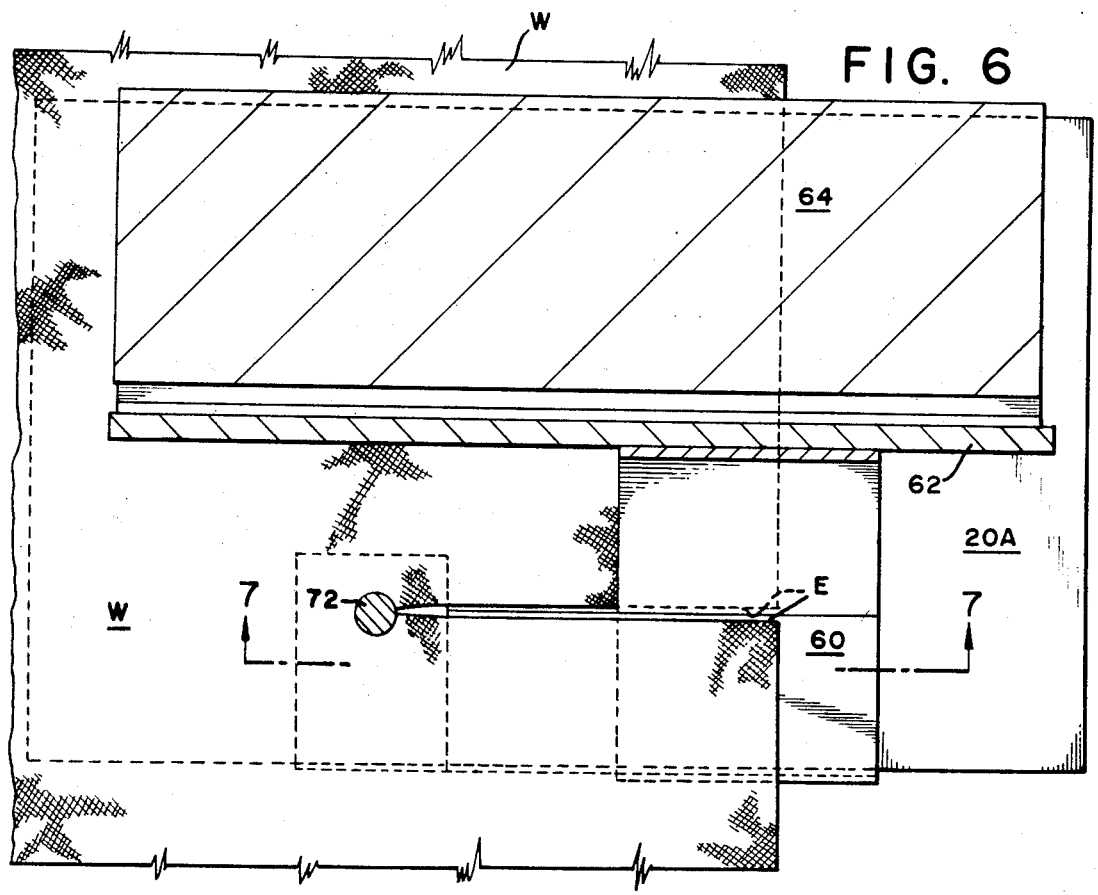
FIG. 6, is a sectional view along lines 6—6 in FIG. 4.

Referring now to FIGS. 3 and 4, the frame 20 is fitted with a bracket plate 60 which supports a vertical mounting plate 62. An electronic power supply 64 is mounted to this plate 62 and this power supply is adapted to receive power line voltage and frequency and provides in response thereto via cable 66 high frequency electrical energy to an electro-acoustic converter unit 68. Typically, the converter unit 68 receives high frequency energy in the range from 16 to 40 kHz. and includes piezoelectric means or magnetostrictive means for converting the applied electrical high frequency energy to mechanical vibrations which are manifest at an output surface 70. The power supply 64 and the electro-acoustic converter unit 68 are commercially obtainable units available from several suppliers, such as Model J–32 manufactured by Branson Sonic Power Company, Eagle Road, Danbury, Conn. and the converter unit 68 may be of a construction as has been revealed in the literature, see for instance, U.S. Pat. No. 3,328,610, issued to S. E. Jacke et al., dated June 27, 1967, entitled "Sonic Wave Generator."

In order to obtain increased mechanical motion, the output surface of the electro-acoustic converter unit 68 is fitted with a horn 72, also known as tool, mechanical amplitude transformer and the like, see "Ultrasonic Engineering" (book) by Julian R. Frederick, John Wiley & Sons, Inc., Inc., New York, N.Y. (1965) pp. 87 to 103. As the horn 72 resonates along its longitudinal axis at its resonant frequency, the frontal surface 72A vibrates with increased mechanical amplitude. As the workpiece W is interposed between the anvil disks and the horn, vibrational energy in the ultrasonic frequency range is imparted to the workpiece to cause the slitting or cutting action described heretofore with the concomitant localized welding or fusing of the thermoplastic fibers. The horn 72 is urged against the anvil structure, comprising the disks 52A, 52B and 52C, by means of a tension spring 80, one end of which is fastened to a bolt 82 which is inserted in an ear 84 projecting from the plate 62. The other end of the spring 80 is fastened to an ear 86 which extends from a barrel shaped housing 13 which supports the converter unit 68. In this manner, a static pressure is applied to the workpiece W and the high frequency or ultrasonic vibrations are superimposed upon this static pressure. There is provided, moreover, a mechanical adjustment, knob 88 extending from a housing 89. The knob serves for adjusting a predetermined mechanical gap between the frontal surface of the horn and the rotating anvil disks so as to prevent a crushing of the workpiece interposed between the anvil and the horn. The details of this mechanical gap or limit setting, not shown in detail, and enclosed in the housing 89 comprise essentially a cam which upon rotation varies a vertical stop in the housing 13 against which the converter unit 68 bottoms. The spring urges the converter unit 68 to rest against the stop.

The carriage 10 is provided, moreover, with a material guide 90 having a straight portion with cut-out 91 underneath the horn, an inclined portion and a straight portion fastened to the bracket 60, see FIG. 3. It will be noted also that the power supply 64 is raised with respect to the platform surface 20A of the U-shaped frame 20. The guide serves to feed the workpiece portion remaining with the loom over the top of the guide 90 and bracket 60, see FIG. 6, whereas the workpiece portion severed is fed through the gap between the underside of the power supply 64 and the upper platform surface 20A of the frame 20. The guide serves to provide a positive separation of the severed portion.

A most important feature of the present invention resides in the fact that the peripheral displacement of the anvil disks relative to the horn surface 72A is correlated with and substantially equal to the translating displacement of the carriage 10 along its path as effected by the rotation of the wheels 26. If this were not the case, the material of the workpiece W would either stretch or pile up in front of the horn 72. By using the same drive shaft 36 and pulley sizes for the translating motion and for the anvil disks, such correlated motion is accomplished in a very simple and expedient manner. A switch 92 adjusts the motor 28 for forward or reverse motion and a switch 94 disposed on the power supply energizes both the power supply 64 and the motor 28 with electrical energy. Most suitably, the motor 28 is energized with direct current.

As shown in the embodiments per FIGS. 1 through 8 the carriage 10 cuts and welds while traversing the width of the workpiece in one direction. When the carriage has arrived at its end position at the opposite side of the workpiece, the carriage must be brought back, the workpiece advanced until the proper length has been fabricated and the cutting operation repeated. The return of the carriage may be accomplished by switching the switch 92 to the reverse motion and letting the ciarriage return. However, it will be advisable to lift the horn 72 from the anvil structure during such return motion and this is readily accomplished by either holding the converter 68 against the force exerted by the spring 80 manually, or alternatively the gap adjustment knob 88 may be operated. Still further a very simple camming mechanism, not shown, can be used for raising the housing 13 during the return motion of the carriage 10. The camming mechanism may either be mechanically or power actuated.

It will be apparent, moreover, that the input power cable to the power supply 64 must be long enough or must operate from a trolley in order to accommodate the desired translating motion of the carriage. Alternatively, the power supply may be at a fixed location and a long cable 66 used instead. This cable, as is well understood, is of the coaxial construction.

FIG. 9 indicates a further embodiment using a pair of electro-acoustic converter units 12A and 12B, each connected alternatively to the power supply 64. During the forward motion of the carriage 10, the forward electro-acoustic transducer is activated and during the return motion of the carriage the rearward transducer is activated. In this manner, the carriage is available for operation in a bidirectional manner. If desired, electromagnetic clutches can be used for selectively activating and deactivating the respective anvil means as is well known to those skilled in the art.

While the above description has dealt with a cutting or slitting operation of a workpiece, it will be apparent that by using well known material guide means two edges of a workpiece can be brought into overlapping relation and an ultrasonic sealing process can be provided rather than a slitting process. In this latter case the center disk 52B is provided with a sealing peripheral surface which is either blunt or embossed. The sealing of thermoplastic workpieces by means of high frequency vibratory energy is well known in the art, see for instance, U.S. Pat. No. 2,633,894 issued to P. B. Carwile entitled "Plastic Welding" dated Apr. 7, 1953. Alternatively, instead of sealing or slitting, when using the resonating horn in combination with one or more embossing wheels, thermoplastic materials, leather, or similar material can be embossed along a straight path with pleasing ornamentation.

It will be apparent that the above invention, showing a self-propelled carriage carrying ultrasonic energy means is extremely useful for subjecting workpieces to ultrasonic energy along a substantially narrow, but straight path. If, however, the guide means, such as the rails 14, are constructed along a curved path, the carriage will follow such curvature as determined by the rails.

Aside from blankets described above, the present apparatus may be used also for slitting webbing, tablecloths, carpeting, thermoplastic sheeting used as covers, slipcover material, curtains, etc. to name a few of the large variety of possible applications.

The present invention by virtue of its simplicity, constitutes a great advance in severing and sealing materials of any width within the range of normal manufacturing techniques.

What is claimed is:

1. An apparatus for exposing sheet material containing thermoplastic material to ultrasonic energy along a comparatively narrow strip comprising:
a carriage adapted to undergo translating motion along a predetermined path;
an ultrasonic converter unit including a horn mounted to said carriage for motion therewith and providing, when energized with high frequency electrical energy, ultrasonic energy to a workpiece in contact with the forntal surface of said horn;
movable anvil means disposed opposite the frontal surface of said horn whereby a workpiece to be exposed to ultrasonic energy is fed between said frontal surface and said anvil means;
motive means coupled to said anvil means and said carriage for causing, when energized, correlated motion between the motion of said anvil means and the translating motion of said carriage along said path, and
control means coupled to said motive means and said converter unit for energizing said motive means and converter unit to cause exposure of said sheet material to ultrasonic energy with concomitant motion of said carriage along said predetermined path.

2. An apparatus as set forth in claim 1, and including means for supporting and guiding said carriage along its translating motion.

3. An apparatus as set forth in claim 2, said carriage being adapted to undergo reciprocating translating motion along said means for supporting and guiding.

4. An apparatus as set forth in claim 2, said carriage including a set of wheels engaging said means for supporting and guiding, and said motive means comprising an electrical motor coupled for driving said wheels and said anvil means in correlated motion.

5. An apparatus as set forth in claim 2, said means for supporting and guiding comprising a set of rails.

6. An apparatus as set forth in claim 1, said movable anvil means being in the form of a rotatable disk, and said motive means causing said carriage to be translated so that the linear carriage displacement substantially equals the peripheral displacement of said disk relative to the position of said frontal surface of said horn.

7. An apparatus as set forth in claim 6, said anvil means including a peripheral edge adapted to serve as a cutting edge when in contact with said frontal surface of said horn.

8. An apparatus as set forth in claim 6, said anvil means including a peripheral surface having a raised pattern to serve as an embossing surface.

9. An apparatus for exposing sheet material containing thermoplastic fibers to ultrasonic energy along a comparatively narrow strip comprising:
a frame having a platform and mounting a drive shaft;
a set of wheels supporting said frame and at least one of said wheels coupled to said drive shaft whereby upon imparting rotation to said drive shaft, said frame undergoes translating motion;
mounting means fastened to said frame;
an electro-acoustic converter unit adapted to receive high frequency electrical energy and provide ultrasonic energy at an output surface secured to said mounting means;
a horn adapted to be resonant along its longitudinal axis coupled to said output surface and the frontal surface of said horn being disposed in proximity to said platform;
rotatable anvil means mounted to said frame and disposed to cause consecutive portions of the peripheral surface of said anvil means to be positioned opposite said frontal surface of said horn, said frontal surface and peripheral surface forming a nip for sheet material fed over said platform;
means coupling said anvil means to said drive shaft and including means for causing the linear displacement of said translating motion of said carriage to be substantially equal to the linear displacement of said peripheral surface of said anvil means relative to said frontal surface, and
motive means coupled to said drive shaft for causing translating motion of said frame and concomitant rotation of said anvil means.

10. An apparatus as set forth in claim 9, said platform having a cut-out portion, and said rotatable anvil means having a peripheral portion disposed in said cut-out.

11. An apparatus as set forth in claim 9, said motive means being an electric motor adapted for bidirectional rotation.

12. An apparatus as set forth in claim 9, and including a set of rails for supporting and guiding said wheels.

13. An apparatus as set forth in claim 9, said anvil means including a disk having a peripheral edge surface for severing sheet material.

14. An apparatus as set forth in claim 9, said anvil means including a disk having a patterned surface for causing embossing of sheet material.

15. An apparatus as set forth in claim 9, and means coupled between said converter means and said frame for urging said frontal surface of said horn toward said anvil means.

16. An apparatus as set forth in claim 15, said means coupled between said converter means and said frame being spring means.

17. An apparatus as set forth in claim 9, and including means for adjusting the gap of said nip.

18. An apparatus as set forth in claim 9, said anvil means comprising a cutting surface and a pair of laterally disposed embossing sealing surfaces.

19. An apparatus as set forth in claim 9, and a power supply adapted to receive power line voltage and frequency and providing high frequency electrical energy to said converter unit mounted to said frame.

20. An apparatus as set forth in claim 9, said power supply being mounted to said frame with means for causing the underside of said power supply and the top surface of said platform to provide a gap for the sheet material as said frame undergoes its translating motion relative to the material.

21. An apparatus as set forth in claim 9 and including a further rotatable shaft, said anvil means being removably fastened upon said further shaft; flexible belt drive means coupling said motive means to said further shaft, and flexible belt drive means coupling said further shaft to said drive shaft.

22. An apparatus as set forth in claim 9, said belt drive means being adjusted to cause during operation the direction of rotation of said further shaft to be opposite to that of said drive shaft.

23. An apparatus as set forth in claim 22 and means supporting said further shaft on said frame.

24. An apparatus as set forth in claim 9, and control means coupled for energizing said converter unit and said motive means with electrical energy.

25. An apparatus as set forth in claim 9, and control means coupled for energizing said converter unit and said motive means substantially simultaneously with electrical energy.

26. An apparatus as set forth in claim 9, said frame being of U-shape comprising said platform and two sides depending therefrom, said drive shaft and another shaft being journalled in said sides, and wheels of said set being mounted also to said another shaft.

References Cited
UNITED STATES PATENTS

| | | | |
|---|---|---|---|
| 3,556,912 | 1/1971 | Burgo et al. | 156—580 |
| 3,666,599 | 5/1972 | Obeda | 156—580 |

DOUGLAS J. DRUMMOND, Primary Examiner

U.S. Cl. X.R.

228—1